Dec. 12, 1950     J. B. PETERSON     2,533,686

GYROSCOPIC SEXTANT

Filed May 14, 1946

Inventor
JOHN B. PETERSON

By Strauch & Hoffman
Attorney

Patented Dec. 12, 1950

2,533,686

UNITED STATES PATENT OFFICE 2,533,686

GYROSCOPIC SEXTANT

John B. Peterson, Bethesda, Md.; Ruth L. Peterson administratrix of said John B. Peterson, deceased Application May 14, 1946, Serial No. 669,547

6 Claims. (Cl. 33—70)

This invention relates to gyroscopic sextants for use when the natural horizon cannot be seen.

The bubble sextant has been recognized as the most satisfactory instrument for the measurement from aircraft of the angular altitude of celestial bodies. However, in comparison to sextants using the natural horizon, the bubble sextant is not as accurate or as convenient to use. Because of horizontal accelerations, it is necessary in using the bubble sextant on aircraft to take observations over a period of one or two minutes and average the results. Many attempts have been made to use a gyroscopic horizon as a reference. Averaging is not necessary and convenience of operation compares favorably with that of natural horizon instruments. These attempts have been unsuccessful because the accuracy of horizons stabilized by small gyroscopes has not been better than plus or minus 10 minutes while an accuracy of plus or minus 3 minutes can be obtained by averaging the readings from a bubble sextant.

The object of this invention is to combine in one instrument the easy-reading advantage of the gyroscopic sextant with accuracy equal or better than that of the bubble sextant.

This object is attained by mechanism illustrated in the accompanying drawing, in which—

Figure 2:
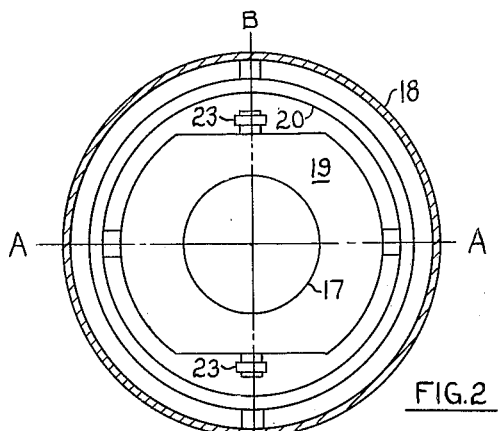
Figure 4:
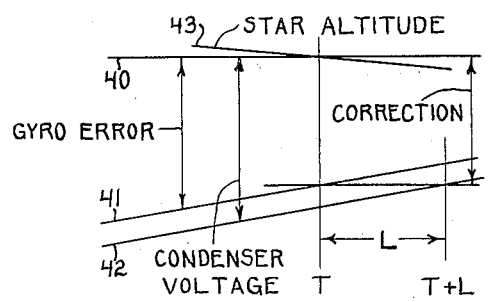
Figure 1:
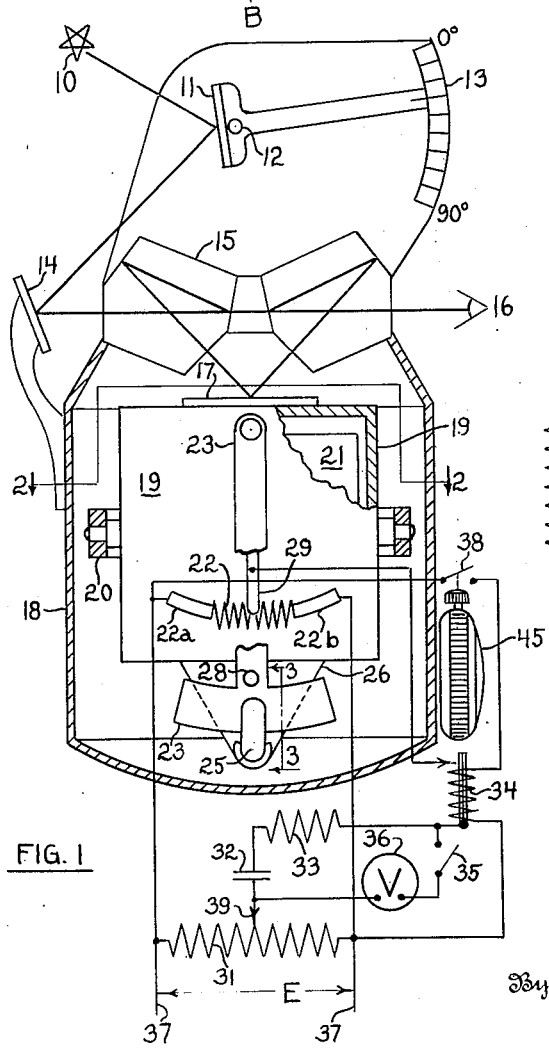
Figure 5:
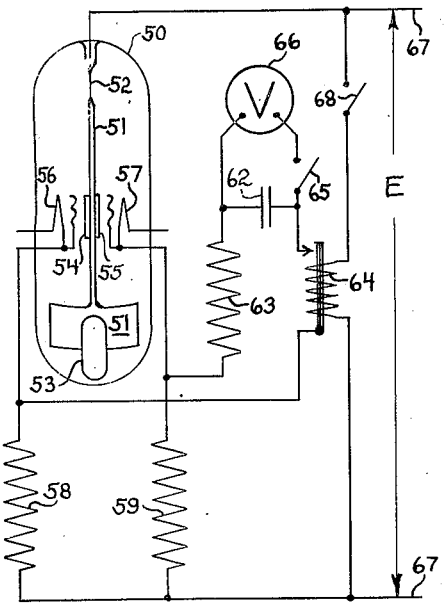
Figure 3:
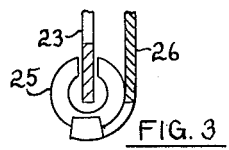

Figure 1 shows the general arrangement of one form of the invention; Figure 2 is a cross section along line 2—2 of Figure 1, showing the gimbal ring suspension; Figure 3 is a cross section of a small part of Figure 1, substantially along line 3—3 of Figure 1, showing a damping magnet and part of a pendulum; Figure 4 shows graphically a typical cycle in the operation of the instrument; Figure 5 illustrates an embodiment employing an electronic pendulum.

Referring to Figure 1, light from the star 10 enters the instrument at index mirror 11 which is adjustable about pivot 12. Index mirror 11 is fitted with an altitude scale 13 on which the altitude of the star is read. From mirror 11 light is reflected to mirror 14 and to prism assembly 15. Part of the light is transmitted straight through the prism assembly to the eye 16 of the observer, and part is reflected to the horizon mirror 17, back into the prism assembly and thus to the eye. The eye will see two images which will coincide when the line of sight 14—16 is parallel to mirror 17.

The prism assembly may be moved through a small angle without affecting the coincidence. It is only necessary that the image be kept in the field of view and that the lateral axis of the instrument be maintained approximately horizontal. Referring to Figure 2, A—A is the longitudinal axis and B—B is the lateral axis. All of the mechanism so far mentioned, with the exception of mirror 17, is mounted on the top of the outer gyro case 18. It is not necessary that any of it be stabilized. As shown in Figure 2, the inner gyro case 19 is suspended from the outer gyro case by gimbal ring 20. Gyro rotor 21, inside case 19 rotates on a vertical axis. It may be electrically driven or air driven. Any of the usual methods may be used to stabilize the gyro, or it may be set to the approximate horizontal and then used as a free gyro.

The mechanism which is mounted on inner gyro case 19, and thus gyro-stabilized, includes horizon mirror 17, potentiometer 22, the supports of pendulum 23, damping magnet 25, and its support 26. Pendulum 23, as shown in Figure 2 is duplicated on the other side of the gyro case and the two parts are tied together, near the bottom, by a strut at 28, to make a unitary pendulum.

Pendulum 23 operates contactor 29 on potentiometer 22. Wires from this contactor and from the ends of potentiometer 22 are led through very flexible conductors through the gimbal ring supports to an indicator unit which may be mounted on the airplane structure at any convenient location.

The indicator unit contains potentiometer 31, condenser 32, resistance 33, automatic time delay switch 34, manual switch 35 and voltmeter 36. Direct current power supply 37—37 is connected to the indicator unit. This power supply may be the airplane's 28-volt power system. A stabilized voltage is not necessary.

Contactor 39 on potentiometer 31 is manually adjusted so that when horizon mirror 17 is exactly horizontal the average voltage between contactors 29 and 39 will be zero. This adjustment requires checking, on the ground, not more often than once a month.

In using the instrument, the average voltage between contactors 29 and 39 over a period of several minutes is an accurate measure of the deviation of horizon mirror 17 from the horizontal.

In Figure 1 switches 34, 35 and 38 are shown in the position they have immediately before an observation is made. Of the three switches only the time delay switch 34 is closed. In this condition condenser 32 is charged through resistance 33 to the average voltage which exists between contactors 29 and 39. The functioning of the indicator unit will be explained further in connection with Figure 4.

The attachment of the gimbal ring 29 between the outer and inner gyro cases is shown in Figure 2. The tops of the two parts of pendulum 23 and the mirror 17 are also shown.

Figure 3 shows a method of damping. Permanent magnet 25 is attached to the inner gyro case by bracket 26. The bottom of the pendulum forms a copper plate which swings between the poles of the permanent magnet, thereby damping the movement of the pendulum.

Referring now to Figure 4, it is assumed that the gyro has been running for several minutes, during which time the instrument has been aimed in azimuth toward the star which is to be observed. It is further assumed that the horizon mirror 17 is slightly off the true horizontal and is drifting at a constant rate as illustrated by gyro position line 41 on Figure 2. The gyro error is negative and is represented by the distance between gyro positions line 41 and zero reference line 40. Condenser voltage, line 42, is such as to indicate a larger negative error than actually exists. As shown between time T and time $T+L$, the condenser voltage is lagging L seconds behind the actual gyro position, L being the time lag of the condenser charging system.

When it is desired to take an observation, coincidence is obtained at time T with the ease which is inherent only in gyro sextants and instruments using the natural horizon. Only one coincidence is required. No averaging on the part of the observer is necessary. When the coincidence has been accomplished at time T, the observer closes switch 38 which is mounted conveniently on the outer gyro case. This operation records the time on stop watch 45 and starts time delay switch 34 to open its contacts at time $T+L$, L seconds after the observation was made. Assuming that the gyro is drifting at a constant rate, the condenser voltage at time $T+L$ will have reached a value corresponding to the proper gyro correction for time T.

At any convenient time, shortly after switch 34 has been opened automatically, switch 35 is closed manually and the correction in seconds is read directly from zero-center voltmeter 36. The true altitude is the reading on scale 13 plus the voltmeter indication.

The star altitude may be constant as indicated by the horizontal reference line 40 or it may be varying as indicated by slanting line 43. In either case the true altitude is obtained at time T.

Time delay switch 34 is shown in Figure 1 as a thermal heater, bimetallic type. Other types, such as pneumatic, may be used. It is adjusted for time of operation equal to L.

Voltmeter 36 should have a high resistance. In some cases it may be advantageous to use a vacuum tube voltmeter.

In balancing a gyroscope on the case of which pendulums are mounted the entire mass of the pendulum is assumed to be concentrated at the point of support. It is not permissible to install stops to limit the travel of the pendulum, as this would upset the balance and cause the gyro to drift excessively. Also, it is desirable that the condenser charge ignore all acceleration above a certain value. One way of accomplishing this is to wind potentiometer 22 of very fine wire and permit the contactor to swing beyond the ends of the winding onto end contacts as indicated at 22a and 22b in Figure 1. If necessary additional resistance can be installed outside the end contacts.

An electronic pendulum is illustrated in Figure 5. The advantage of this device is that all friction such as exists in potentiometer contact 29 is eliminated. The electron tube is mounted on the stabilized gyro case.

Inside the glass envelope 50 is a pendulum 51 which is supported by flexure plate 52. To provide damping the bottom of the pendulum is a copper plate which swings in the air gap of a permanent magnet 53. Anodes 54 and 55 attached to pendulum 51 are spaced between cathodes 56 and 57. As the pendulum swings the anode-cathode resistance increases on one side and decreases on the other. This tube is connected in a bridge circuit with resistances 58 and 59. Parts 62 to 69 inclusive in Figure 5 perform the same functions as parts 32 to 39 inclusive in Figure 1. All of these parts except switch 68 are placed in the indicator unit.

The use of this electron tube as a micrometer has been fully described by Dr. Ross Gunn at the annual meeting of the American Society of Mechanical Engineers, held at Philadelphia, Pennsylvania, December 4-8, 1939.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gyroscopic sextant comprising a universally suspended gyroscope rotating on an approximately vertical axis, means for measuring the altitude of a celestial body from the case of said gyroscope as an approximate horizon, a pendulum mounted upon said gyroscope, and means responsive to movements of the pendulum for determining the position of said pendulum with respect to the gyroscope as an indication of the true horizon.

2. A gyroscopic sextant comprising a gyroscopic horizon, means for measuring the altitude of a celestial body relative to said gyroscopic horizon, a pendulum mounted upon said gyroscopic horizon, and means responsive to movements of the pendulum for determining the average position of said pendulum with respect to the gyroscope horizon over a period extending before and after the time of said altitude measurement.

3. A gyroscopic sextant comprising a gyroscopic horizon, means for measuring the altitude of a celestial body from said gyroscopic horizon as a reference, a pendulum mounted upon said gyroscopic horizon, an electric circuit including a condenser, means in said circuit and controlled by said pendulum for charging said condenser to a voltage proportional to the difference between said gyroscopic horizon and the true horizon as represented by the average position of said pendulum, and means in said circuit for determining the voltage to which said condenser is charged as an indication of the correction to be applied to said altitude measurement.

4. In combination with a gyroscopic sextant comprising a gyroscope and means for measuring the altitude of a celestial body from the case of said gyroscope as an approximate horizon; means for determining the difference between said approximate horizon and the true horizon as a correction to be applied to said altitude measurement determined from said approximate horizon, comprising an electric circuit including a source of voltage supply, a correction indicator, and an electronic pendulum mounted on said gyroscope and connected to said indicator to indicate the departure of said gyroscope from the true horizontal, said electronic pendulum including an anode and a cathode one of which is fixedly mounted with respect to the gyroscope axis and the other of which is pendulously mounted with respect to the gyroscope axis.

5. A gyroscopic sextant comprising a gyroscopic horizon, means for measuring the altitude of a celestial body from said gyroscopic horizon as a reference; a pendulum mounted upon said gyroscopic horizon; an electrical circuit including a condenser; means in said circuit including a potentiometer having a movable contactor controlled by said pendulum, for charging said condenser at a rate proportional to the difference between the voltage of said condenser and the voltage at said contactor; means for closing said circuit to initiate said charge; means for automatically discontinuing said charge after a fixed time equivalent to the time constant of the condenser charging system; and means in said circuit for measuring the voltage of the charge on said condenser as an indication of the correction to the applied to said altitude measurement.

6. A gyroscopic sextant comprising a gyroscopic horizon; means for measuring the altitude of a celestial body relative to said gyroscopic horizon; second means mounted upon said gyroscopic horizon and movable in response to the forces which establish the apparent vertical; and means responsive to the movements of the said second means for indicating the average position of said gyroscopic horizon with respect to the apparent vertical over a period of time extending before and after the time of said altitude measurement.

JOHN B. PETERSON.

REFERENCES CITED

The following references are of record in the file of this patent:

UNITED STATES PATENTS

| Number | Name | Date |
|---|---|---|
| 2,177,094 | Carter et al. | Oct. 24, 1939 |
| 2,403,919 | Hagner | July 16, 1946 |

FOREIGN PATENTS

| Number | Country | Date |
|---|---|---|
| 509,648 | France | Aug. 23, 1920 |